UNITED STATES PATENT OFFICE.

LEONHARD LEDERER, OF SULZBACH, GERMANY.

PROCESS OF PRODUCING ACETYLSALICYLIC ACID.

SPECIFICATION forming part of Letters Patent No. 671,769, dated April 9, 1901.

Application filed March 16, 1900. Serial No. 8,971. (No specimens.)

*To all whom it may concern:*

Be it known that I, LEONHARD LEDERER, a citizen of Germany, residing at Sulzbach, in the Kingdom of Bavaria, Germany, have invented certain new and useful Improvements in Processes of Producing Acetylsalicylic Acid and its Derivatives, of which the following is a specification.

The substitution of acetyl for the hydroxyl-hydrogen of salicylic acid and its derivatives by means of acetic anhydrid is accomplished according to present methods only through application of a high heat.

This invention relates to a new process of producing these substances, according to which the introduction of the acetyl group into the hydroxyl of salicylic acid can be accomplished without use of heat, the reaction being performed for this purpose in the presence of a condensing agent. In this way the acetylization of the salicylic acid, as well as of its derivatives, is easily and successfully accomplished.

The process is carried out as follows:

First. To a mixture of one hundred parts salicylic acid

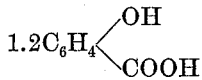

and one hundred and fifty parts acetic anhydrid two parts concentrated sulfuric acid are added. Upon becoming warm, within a short time nearly perfect liquefaction of this mixture takes place, and then the acetyl salicylic acid

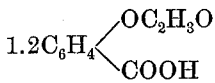

begins to settle in crystals, melting at 118°. From the crystals the main portion of the lye is removed by decanting and the remainder by washing with water. From the united lyes an additional small amount of acetylic acid may be separated on adding water.

Second. A mixture of two hundred parts of wintergreen-oil

two hundred parts acetic anhydrid, and one part concentrated sulfuric acid is allowed to stand for some time. To the resulting product water is added, whereupon the acetyl derivative of wintergreen-oil

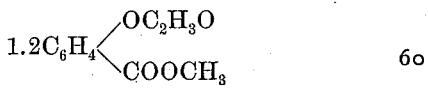

is deposited as an oil, which solidifies after the introduction of a crystal of the solid combination. The new combination melts at 51° to 52° centigrade. In the same way the acetyl salicylamid is obtained, which melts at 144° to 145°, at this temperature part of the acetyl group being split off.

Having thus described my invention, I claim as new and desire to secure by Letters Patent—

1. The herein-described process of substituting the acetyl group for the hydrogen of the hydroxyl group of salicylic acid and of its derivatives, consisting in causing the reciprocal action of salicylic acid and acetic anhydrid in the presence of a condensing agent, substantially as set forth.

2. The herein-described process of producing acetyl salicylic acid, which consists in causing the reciprocal action of salicylic acid and acetic anhydrid in the presence of concentrated sulfuric acid, substantially as set forth.

In testimony that I claim the foregoing as my invention I have signed my name in presence of two subscribing witnesses.

LEONHARD LEDERER.

Witnesses:
FERDINAND SCHRAUD,
JOHANN STROBEL.